United States Patent
Divvi et al.

(10) Patent No.: US 12,212,962 B2
(45) Date of Patent: Jan. 28, 2025

(54) DYNAMIC KEY CACHING FOR FAST ROAMING IN SECURED WIRELESS NETWORKS

(71) Applicant: CHARTER COMMUNICATIONS OPERATING, LLC, St. Louis, MO (US)

(72) Inventors: Venkata Divvi, Centennial, CO (US); Christopher Teague, Highlands Ranch, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 261 days.

(21) Appl. No.: 17/703,364

(22) Filed: Mar. 24, 2022

(65) Prior Publication Data

US 2023/0308870 A1     Sep. 28, 2023

(51) Int. Cl.
| | |
|---|---|
| *H04W 12/06* | (2021.01) |
| *H04W 12/0433* | (2021.01) |
| *H04W 12/63* | (2021.01) |
| *H04W 84/12* | (2009.01) |

(52) U.S. Cl.
CPC ....... *H04W 12/06* (2013.01); *H04W 12/0433* (2021.01); *H04W 12/63* (2021.01); *H04W 84/12* (2013.01)

(58) Field of Classification Search
CPC . H04W 12/06; H04W 12/0433; H04W 12/63; H04W 84/12
See application file for complete search history.

(56) References Cited

U.S. PATENT DOCUMENTS

| | | | |
|---|---|---|---|
| 7,672,459 B2 | 3/2010 | O'Hara, Jr. et al. | |
| 8,442,006 B2* | 5/2013 | Haddad ................ | H04W 12/06 370/331 |
| 8,446,876 B2 | 5/2013 | Calhoun et al. | |
| 9,888,387 B2* | 2/2018 | Chen .................... | H04W 60/005 |
| 10,715,999 B2 | 7/2020 | Sharma et al. | |
| 2005/0047371 A1* | 3/2005 | Bennett ............. | H04W 36/0085 370/331 |
| 2007/0297358 A1* | 12/2007 | Chang ................... | H04W 48/18 370/328 |
| 2010/0220856 A1* | 9/2010 | Kruys ..................... | H04L 9/321 380/270 |
| 2012/0144462 A1* | 6/2012 | Pochop, Jr. ........... | H04L 63/062 726/6 |

(Continued)

*Primary Examiner* — Abiy Getachew
(74) *Attorney, Agent, or Firm* — Patent Beach PC

(57) ABSTRACT

Various embodiments comprise systems, methods, architectures, mechanisms and apparatus for caching and sharing client/device keys, session keys, and so on between APs of overlapping wireless networks operated by same or different wireless local areal network (WLAN) operators via one or more Neighbor Key Cache Servers (NKCSs) configured to store client device or session key data for client devices overlapping network boundaries so as to facilitate fast reauthentication between presently serving and target access points (APs) of the same or different WLAN operators. Neighbor reports data may comprise data based on WLAN/SSID from APs associated with each of a plurality of AP home regions and/or realm/Network Access Identifiers from APs associated with an overlapping network of a different WLAN operator.

26 Claims, 11 Drawing Sheets

(56) References Cited

U.S. PATENT DOCUMENTS

| | | | | |
|---|---|---|---|---|
| 2016/0366638 A1* | 12/2016 | Kumar | ............... | H04W 52/0209 |
| 2018/0035292 A1* | 2/2018 | Soundararajan | ...... | H04W 12/06 |
| 2018/0376388 A1* | 12/2018 | Luo | ................... | H04W 36/0016 |
| 2020/0059356 A1 | 2/2020 | Shveykin et al. | | |
| 2021/0105639 A1* | 4/2021 | McFarland | ........... | H04W 24/02 |
| 2021/0289493 A1* | 9/2021 | Choi | ................... | H04W 72/542 |

\* cited by examiner

Controller is operative to: _810_

- Manage at least one mobility group (AP group)
- Receive authentication data as client devices associate with new / target AP within a managed AP group (retrieved from AP cache, AP group key cache or NKCS, or provided during AAA / Radius authentication)
- Store received authentication data within a respective group key cache of presently serving AP group (each group key cache stores authentication data useful in authenticating client device where present and target AP are in same mobility group)
- Receive neighbor AP reports from APS in managed AP groups, each neighbor AP report identifying for a reporting AP any APS proximate the reporting AP
- Identify reporting APS proximate APS that are not members of the reporting AP group, and store authentication data of clients of identified reporting APS in a neighbor key cache server (NKCS) (NKCS stores authentication data useful in authenticating client device where present and target AP are in different mobility groups)
- Periodically optimize NKCS data (e.g., time of the day key queue optimization, most recent sessions on top optimization, cleanup of stale contexts optimization, etc.)

In response to receiving a client device authentication request _820_
from an AP (requesting / target AP), controller is operative to:

- Search for client device key in group key cache of requesting AP group using client device identifier;
- In response to finding client device key in group key cache, retrieve the identified key and transmit it toward the requesting / target AP to enable thereby authentication of the client device to the requesting / target AP;
- In response to not finding client device key in group key cache, search for client device key in NKCS using client device identifier;
- In response to finding client device key in NKCS, retrieve the identifed key and transmit it toward the requesting / target AP to enable thereby authentication of the client device to the requesting / target AP
- In response to not finding client device key in NKCS, search for client device key in other operator's NKCS using client device identifier
- In response to finding client device key in other operator's NKCS, retrieve the identified key and transmit it toward the requesting / target AP to enable thereby authentication of the client device to the requesting / target AP

*FIG. 8*

DYNAMIC KEY CACHING FOR FAST ROAMING IN SECURED WIRELESS NETWORKS

FIELD OF THE DISCLOSURE

The present disclosure generally relates to key distribution and caching methods in large wireless local area networks.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In traditional secured wireless local area networks (WLANs), such as 802.11x Wi-Fi networks, key caching and fast transitions procedures are in use to reduce the latency associated with a client device (or station) reauthentication during inter-AP (access point) mobility, or when the device is revisiting a previously served AP. This key caching provides a better user experience on mobility by eliminating full length reauthentication and key generation procedures, which is especially useful for time sensitive applications such as voice over Wi-Fi, content streaming, and mobile traffic offloading continuity. For example, voice over Wi-Fi requires that reauthentication should be completed in less than 150 ms for mobility scenarios to avoid bad user experiences and call drop.

In the case of a service provider having a large-scale deployment of APs serving an even larger number of client devices, key caching mechanisms require a significant amount of system resources and optimized techniques to accomplish the goal of faster reauthentication of client devices at APs.

Present solutions provide key caching using centralized controller-based Wi-Fi solutions that limited to relatively low numbers of Access Point groupings. Such groupings are also not optimized for traffic patterns, coverage, and so on. Typically, subscriber or client device mobility between Access Points in service provider deployments triggering full length authentication exchanges between client device and AP, resulting bad user experience due to service interruption during re-authentication, generating RADIUS traffic to authentication servers and backend data bases.

As an example, consider a centralized deployments controller managing the tens of thousands of Access Points and hundreds of thousands of end user devices. Wi-Fi wireless coverage in most of the cases like small and medium-size business (SMB)/Aerial are discrete and complete continuous overlap. Key caching for such large-scale deployments using centralized controllers in a generic manner requires significant capacity and system resource requirements. To address this, some implementations restrict key caching to specific groups of APs, which may be selected using these APs' IP address subnet, proximity, and so on. Usually, the client devices end up using a trial and error mechanism, finally fail to use a key cache if the target AP is not managed by same AP Group, and as a result go through full authentication that leads to session interruptions.

Newer Wi-Fi standards added some techniques to help a device in selecting the target network for roaming, but those techniques typically addressed only a subset of legacy use cases. Key caching and fast roaming are not new concepts, defined in IEEE 802.11i (PMK caching), 802.11r (Fast Roaming) and 802.11k (neighbor report) standards and related documents. Each AP gathers a neighbor AP list and provides this information to a device requesting such information. These neighbor reports, which are mostly based on service set identifier (SSID) or extended SSID (ESSID) match criteria, help a client device select and perform fast roaming to a target AP by avoiding channel scan and selecting the proper target AP. However, criteria used for such neighbor reports are failing for large scale deployments, especially for APs managed by different AP groups, different controllers or different operators, or newer technologies such as the Passpoint-based intra-MSO (multiple system operator) and inter-MSO roaming technologies. These and other sub-optimal technologies often result in full authentication of client devices during roaming between APs in various AP deployment scenarios, where such full authentication is impacting the user experience, generating a huge volume of traffic load to authentication servers, and reducing operator revenue.

SUMMARY

Various deficiencies in the prior art are addressed by systems, methods, and apparatus for caching and sharing client/device keys, session keys, and so on between APs of overlapping wireless networks operated by same or different wireless local areal network (WLAN) operators via one or more Neighbor Key Cache Servers (NKCSs) configured to store client device or session key data for client devices overlapping network boundaries so as to facilitate fast reauthentication between presently serving and target access points (APs) of the same or different WLAN operators. Neighbor reports data may comprise data based on WLAN/SSID from APs associated with each of a plurality of AP home regions and/or realm/Network Access Identifiers from APs associated with an overlapping network of a different WLAN operator.

One embodiment comprises a computer-implemented method in a controller managing at least one group of access points (APs) of a wireless local area network (WLAN) service provider, the method comprising: receiving, at the controller, authentication data for each client device associated with a presently serving AP within a managed AP group; storing received authentication data within a respective group key cache of the presently serving AP group, each group key cache storing cached authentication data suitable for authenticating a client device to a target AP within the same AP group as a respective presently serving AP; receiving, at the controller, neighbor reports from APs within each AP group managed by the controller, each neighbor report identifying for a reporting AP any APs proximate the reporting AP; identifying, using received neighbor reports, reporting APs proximate APs that are not members of the group of APs including the reporting AP; storing, in a neighbor key cache server (NKCS), authentication data for each client device associated with a serving AP proximate an AP that is not a member of the group of APs including the serving AP, the NKCS being configured for storing cached authentication data suitable for authenticating a client device to a target AP within an AP group different than the AP group of the respective presently serving AP; and in response to receiving a client device authentication request from an AP, searching the requesting AP group key cache using a client key identifier; in response to identifying a key corresponding to the client device in the group key cache, transmitting the identified key toward the requesting AP to enable thereby authentication of the client device to the requesting AP; in response to not identifying a key corresponding to the client device in the group key cache, searching the NKCS using the client key identifier; in response to identifying a key corresponding to the client device in the NKCS, transmitting the identified key toward the requesting AP to enable thereby authentication of the client device to the requesting AP.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 8 depicts a method according to an embodiment.

Figure 1:
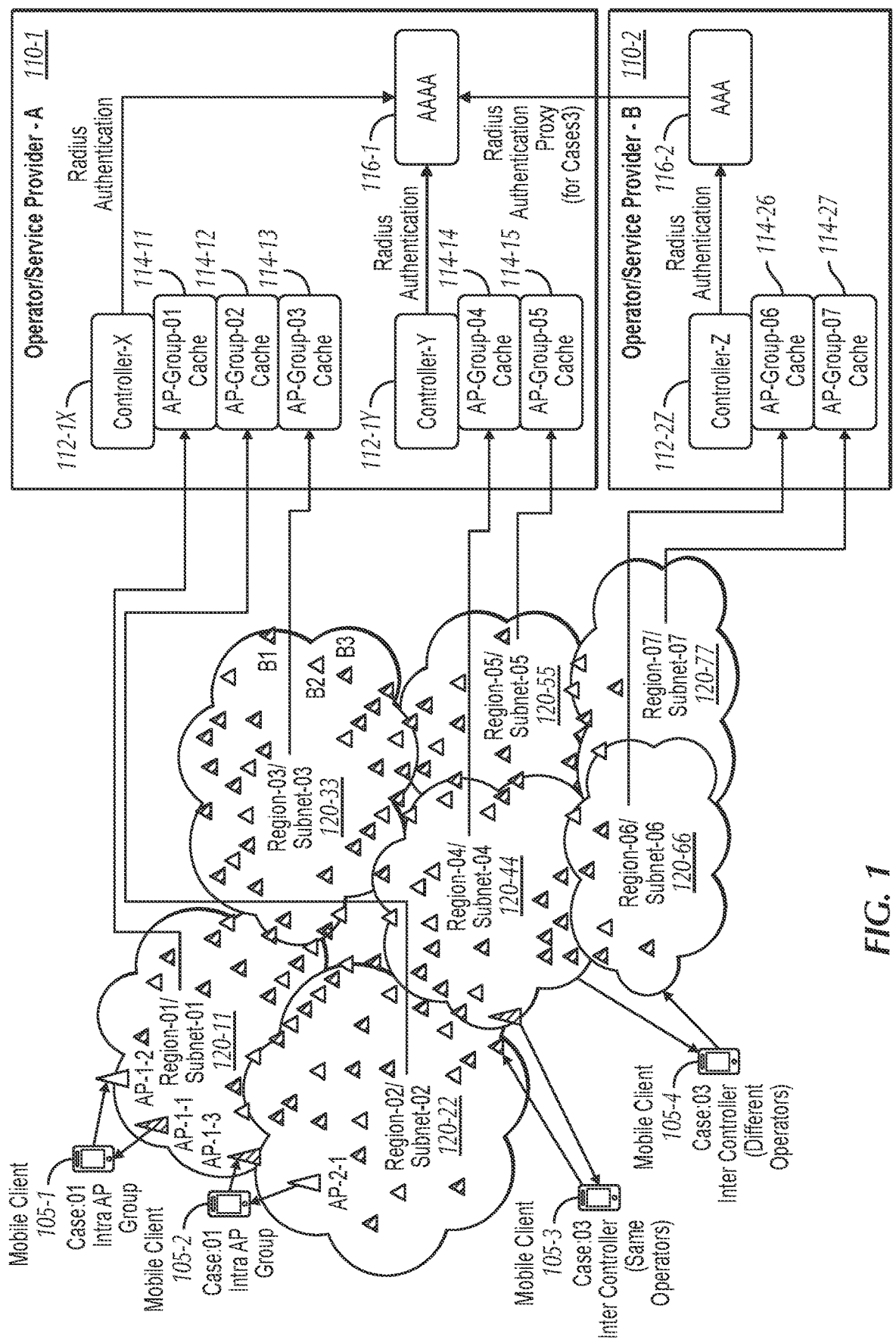
FIG. 1 depicts a graphical representation of a plurality of deployed networks associated with different network operators useful in understanding the embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide a scalable key caching mechanism, such as for secured WLAN authentication, wherein the key caching mechanism is configured to construct a dynamic key cache (using enhanced techniques for neighbor detection, enhanced key search such as via client key identifiers associated with the client keys, and reordering the keys in a database for potential subscriber mobility using various heuristics. Advantageously, the various embodiments provide a vendor agnostic solution so as to provide the benefits of the various embodiments to deployments including APs managed by different groups or controllers or inter MSO roaming partnerships.

FIG. 1 depicts a graphical representation of a plurality of deployed networks associated with different network operators useful in understanding the embodiments. Specifically, FIG. 1 depicts a plurality of deployed access points (APs) forming, illustratively, seven regions or groups of APs (120-11 through 120-77), wherein each of the APs in a region (1-7) is associated with a corresponding subnet (1-7) and is controlled by one or the other of the two differing network providers A and B. FIG. 1 also depicts a portion of network management (NM) entities associated with each of the network providers A and B; namely, a first NM 110-1 associated with the first network provider A and a second NM 110-2 associated with the second network provider B.

As shown in FIG. 1, the first NM 110-1 includes a controller-X denoted as 112-1X that is configured to control APs in each of the first 120-11, second 120-22 and third 120-33 network regions, and that is configured to cache information associated with each of the first 120-11, second 120-22 and third 120-33 network regions via cooperating AP group caches 114-11, 114-12, and 114-13.

As shown in FIG. 1, the first NM 110-1 includes a controller-Y denoted as 112-1Y that is configured to control APs in each of the fourth 120-44 and fifth 120-55 network regions, and that is configured to cache information associated with each of the fourth 120-44 and fifth 120-55 network regions via cooperating AP group caches 114-14 and 114-15.

As shown in FIG. 1, the second NM 110-2 includes a controller-Z denoted as 112-2Z that is configured to control APs in each of the sixth 120-66 and seventh 120-77 network regions, and that is configured to cache information associated with each of the sixth 120-66 and seventh 120-77 network regions via cooperating AP group caches 114-26 and 114-27.

In operation, client devices 105 (or user equipment (UE) more generally) may receive network services via any proximate AP, irrespective of the region or group of APs including the AP, or the Operator or Service Provider associated with the APs within that region or group of APs.

FIG. 1 is useful in describing several common scenarios associated with large scale service provider deployments, such as where each of the regions or groups of APs (120-11 through 120-77) may comprise hundreds of thousands or even millions of APs, in which case the sheer number of APs presents a problem that the standard mechanisms of key caching simply break down.

As will be described in more detail below with respect to the remaining figures, one or both of the first NM 110-1 (associated with the first network provider A) and second NM 110-2 (associated with the second network provider B) further include a Neighbor Key Cache Server (NKCS) operative to dynamically maintain the key information required to complete faster authentication on overlapped APs such as APs managed by different controllers operated by same service providers, or APs managed by different controllers operated by different service providers.

In particular, all or at least a large subset of the APs within a particular region, subnet, or group gathers information pertaining to nearby or neighbor APs. For example, IEEE 802.11k contemplates that a beacon with one or more basic service set identifiers (BSSIDs) is periodically sent to advertise a presence for new connections and maintain current connections, whereupon the APs listen for packets addressed to associated BSSIDs and ignore packets addressed to unassociated BSSIDs to generate thereby respective neighbor reports which may be provided to a corresponding controller 112.

In various embodiments, instead of ignoring packets addressed to unassociated BSSIDs (i.e., APs associated with a different controller 112), the APs include in their neighbor reports any SSID and other information related to neighbor APs associated with any controller, whether a different controller 112 of the same Operator, or a controller 112 of a different Operator.

In this manner, a controller 112 associated with a particular region of a particular Operator may perform SSID matching and other operations on its received neighbor reports to identify neighbor APs beyond the boundaries of its controlled region, such as APs in another region controlled by the same Operator or APs in a region controlled by a different Operator.

The controller 112 may determine that an AP in another region is managed by a different controller 112 of the same Operator or Service Provider using inventory information (i.e., whether the SSID or BSSID or other information of an AP in another region matches that of a deployed AP from the same Operator/Provider). If there is no matching AP in inventory, then the AP must be managed by a different Operator or Service Provider.

The controller 112 may map the contours of the footprint or coverage area associated with the region of APs it manages, as well as the extent of overlap with AP regions of other Operators or Service Providers, by noting the locations of APs within its region providing neighbor reports identifying neighbor APs managed by other Operators or Service Providers.

In various embodiments, each of the controllers 112 of a particular Operator are configured to register with the NKCS various details about their managed APs proximate managed region boundaries, as well as any neighbor APs of those managed APs (irrespective of controller or operator), such that neighbor AP information stored at the NKCS may be used to identify APs managed by different controllers of the same Operator and/or APs managed by controllers of different Operators.

In particular, some exemplary scenarios in large scale service provider deployments that will be discussed below and addressed by the various embodiments comprise, illustratively:

(1) client device mobility intra-AP group/region (same region of an Operator, same controller);
(2) client device mobility inter-AP group/region with common controller (different regions of an Operator, each region managed by the same centralized controller);
(3) client device mobility inter-AP group/region with different controllers (different regions of an Operator, each region managed by a respective controller of the same operator); and
(4) client device mobility in inter-AP Group from different Operators acting as Wi-Fi roaming partners (different regions, each region associated with a respective Operator and therefore managed by a different controller).

Intra-Operator Roaming Scenarios

Exemplary Scenario (1): Client device mobility intra-AP group/region (same region of an Operator, same controller). Within the context of this scenario, the various APs are configured to serve secure SSIDs with fast roaming protocols enabled. Referring to FIG. 1, is can be seen that a client device 105-1 associated with a present serving AP-1-1 in Region-01 (120-11) is moving toward or otherwise going to connect with a target AP-1-1 in the same Region-01 (120-11).

When the client device 105 of a subscriber associated to SSID on one of these APs in Region-01 for the first time, it completed an EAP authentication flow that was between client device and an authentication, authorization and accounting (AAA) server 116 (e.g., a RADIUS protocol AAA server) configured to authenticate client devices connecting to APs of an operator or service provider.

With fast roaming protocols enabled on a centralized controller 112-1X, the controller 112-1X stored security association details in the key cache 114-11 maintained by the region-01 mobility group. The subscriber device 105-1 may receive a neighbor report (based on SSID match) from the present serving AP (AP-1-1) and select the target AP (AP-1-2). With fast roaming protocols enabled, the target AP uses the key details cached and successfully reauthenticates the client device 105 without requiring the client device 105 to go through a complete authentication using RADIUS.

Unfortunately, the scale of APs that may be grouped under a mobility group limited by system resource requirements and neighbor reports or key search mechanisms are not much optimized.

Exemplary Scenario (2): Client device mobility inter-AP group/region with common controller (different regions of an Operator, each region managed by the same centralized controller). Referring to FIG. 1, is can be seen that a client device 105-2 associated with a present serving AP-2-1 in Region-02 (120-22) is moving toward or otherwise going to connect with a target AP-1-1 in a different region, namely Region-01 (120-11). Within the context of this scenario, the various APs are configured to serve secure SSIDs with fast roaming protocols enabled.

When the client device 105 of a subscriber associated to SSID on one of these APs in Region-01 for the first time, it completed an EAP authentication flow that was between client device and an authentication server 116.

With fast roaming protocols enabled on a centralized controller 112-1X, the controller 112-1X stored security association details in the key cache 114-11 maintained by the region-01 mobility group as well as the key cache 114-12 maintained by the region-02 mobility group. The subscriber device 105-1 may receive a neighbor report (e.g., based on SSID match) from the present serving AP (AP-2-1) and select the target AP (AP-1-3).

With fast roaming protocols enabled, the client device 105 may try to use fast reassociation procedures. However, since the present serving AP (in Region-02) does not belong to same mobility group as the target AP (Region-01) the key details cached cannot be used (even though configured with same mobility ID). The target AP rejects the fast-roaming procedures and the client device 105 must go through complete authentication RADIUS. Unfortunately, as anchor AP (Region-01) and target AP (region-02) are grouped under different mobility groups, neighbor reports are not accurate about suggesting the target AP, the resulting key cache is not useful, and client device 105-2 needs to go through complete authentication procedures. This impacts the time sensitive services like voice over Wi-Fi, live video streaming sessions interrupted.

Various embodiments are suitable for use in addressing the above-described intra-operator roaming scenarios 1 and 2. In accordance with these embodiments, when a subscriber is associated to SSID on one of a home operator's serving APs for the first time, a complete EAP authentication flow performed between client device 105 and authentication server (e.g., AAA server 116). At the end of authentication, the AAA server will send the Master Session Key (MSK) to the authenticator (e.g., controller 112). The MSK is used to derive the further key hierarchy required for data encryption, etc., The authenticator acts as the true source of key material to share with the centralized manager (e.g., NKCS 118).

Intra-Operator Roaming Scenarios

Exemplary Scenario (3): Client device mobility inter-AP group/region with different controllers (different regions of an Operator, each region managed by a respective controller of the same operator). Referring to FIG. 1, is can be seen that a client device 105-3 associated with a present serving AP-2-2 in Region-02 (120-22) is moving toward or otherwise going to connect with a target AP-4-1 in a different region, namely Region-04 (120-44). Within the context of this scenario, the various APs are configured to serve secure SSIDs with fast roaming protocols enabled.

When the client device 105-3 of a subscriber associated to SSID on one of these APs in Region-02 for the first time, it completed an EAP authentication flow that was between client device and an authentication server 116.

With fast roaming protocols enabled on a centralized controller 112-1X, the controller 112-1X stored security association details in the key cache 114-12 maintained by the region-02 mobility group. The subscriber device 105-3 may receive a neighbor report (e.g., based on SSID match) from the present serving AP (AP-2-2) and select the target AP (AP-4-1) from Region-04.

With fast roaming protocols enabled, the client device 105 may try to use fast reassociation procedures. However, since the target AP (Region-04) does not belong to the same mobility group as the presently serving (anchor) AP (Region-02) the key details cached cannot be used (even though configured with same mobility ID). The target AP rejects the fast-roaming procedures and the client device 105 must go through complete authentication RADIUS.

Unfortunately, as anchor AP (Region-02) and target AP (region-04) are managed by different controllers, neighbor reports are not accurate about suggesting the target AP resulting, the resulting key cache is not useful, and client device 105-3 needs to go through complete authentication procedures.

Exemplary Scenario (4): Client device mobility in inter-AP Group from different Operators acting as Wi-Fi roaming partners (different regions, each region associated with a respective Operator and therefore managed by a different controller). Referring to FIG. 1, is can be seen that a client device 105-4 associated with a present serving AP-4-2 in Region-04 (120-44) is moving toward or otherwise going to connect with a target AP-6-1 in a different region, namely Region-06 (120-66) managed by a different Operator. In this scenario, the client device 105-4 is moving between APs managed by different service providers and configured to serve via secure Passpoint SSIDs (each operator SSID having a different name) with fast roaming protocols enabled.

When the client device 105-4 of a subscriber associated to SSID on one of these APs in Region-04 for the first time using Passpoint, it completed an EAP authentication flow it completed an EAP authentication flow that was between client device and an authentication server 116 associated with the Operator of Region-04; namely, AAA 116-1. With fast roaming protocols enabled on the centralized controller 112-1Y, the controller 112-1Y stored security association details in a key cache 114-14 maintained for the region-04 mobility group.

With fast roaming protocols enabled, the client device 105 may try to use fast reassociation procedures. However, since the target AP (Region-06) does not belong to the same mobility group as the presently serving (anchor) AP (Region-04) the key details cached cannot be used. The target AP rejects the fast-roaming procedures and the client device 105 must go through complete authentication RADIUS.

Further, the client device may receive a neighbor report (based on SSID match) from a present serving AP (AP-4-2), but a potential target AP (such as from Region-06) broadcasting a different SSID name and managed by a different Operator will not part of that report, even though the Region-06 APs are capable of providing services to roaming client devices associated with partner networks. As such, the client device cannot use fast roaming protocols and must go through complete authentication procedures with AP-6-1.

In the case of Passpoint based roaming, a subscriber may roam between different WLAN's/SSID's but still using same subscription (e.g. Operator A subscriber roaming from SSID1 (Operator A's Mobile Network) to SSID2 (Operator B's Mobile Network).

Various embodiments are suitable for use in addressing the above-described inter-operator roaming scenarios 3 and 4. In accordance with these embodiments, when a subscriber is associated to SSID on one of a home operator's serving APs (in overlapping coverage area with roaming partner APs) for the first time, a complete EAP authentication flow is performed between client device 105 and the home operator authentication server. At the end of the authentication, the AAA server will send the Master Session Key (MSK) to the authenticator, The MSK is used to derive the further key hierarchy required for data encryption, etc., The authenticator acts as the true source of key material to share with the centralized manager (e.g., anchor operator NKCS or NKCSAnchor). The NKCSAnchor detects the serving AP's proximity with roaming partners and shares the required key material to the roaming or target operator NKCS or NKCSTarget.

Various embodiments enhance neighbor detection so as to use service provider details provided by neighbor Access Points, add an intelligence to detect the neighbor AP's management domain. Each AP reports and updates the list of neighbor AP's in centralized server. When subscriber authenticated on secured network serviced by the AP will persist the required keys for reauthentication in different scenarios like roaming to neighbor AP's or reassociating to same AP within key validity period. In the roaming cases, when device attempting to associate target AP (from the list of neighbor AP's reported to centralized server), with the information received from the device the target AP/controller first checks with centralized cache server for any keys stored for fast reauthentication. If the key association exists, then it will use for faster reauthentication instead of executing full authentication with external authentication server.

In various embodiments, in the case of overlapping wireless networks operated by the same operator but segmented for functional and operational easiness, neighbor reports data will be reported to centralized manager (NKCS) irrespective of AP's home region and these reports are based on WLAN/SSID.

In various embodiments, in the case of overlapping wireless networks operated by different operators with different network names (i.e., WLAN/SSID name), neighbor reports data will be reported to centralized manager (NKCS) irrespective of AP's home region and these reports are based on servicing network identifiers (i.e. realm/Network Access Identifiers) agreed for roaming between operators. Inter operator roaming cases, both NKCSs will exchange key identifiers based on proximity of overlapping AP's on real time basis to avoid full length authentication transactions.

In various embodiments, for inter operator roaming based on roaming agreements, overlapping APs implement a Station functionality to detect neighbors on common network service identifiers (i.e., realm/Network Access Identifiers), and each AP (or a portion of the APs) learns the overlapping roaming partners using, illustratively, Access Network Query Protocol (IEEE 802.11u, ANQP). Further, Wi-Fi client devices may implement advanced inter-operator fast roaming using network service identifiers (i.e., realm/Network Access Identifiers) irrespective of serving network identifiers (i.e., WLAN/SSID, where each operator may service the customers using their own WLAN/SSID name).

Figure 2:
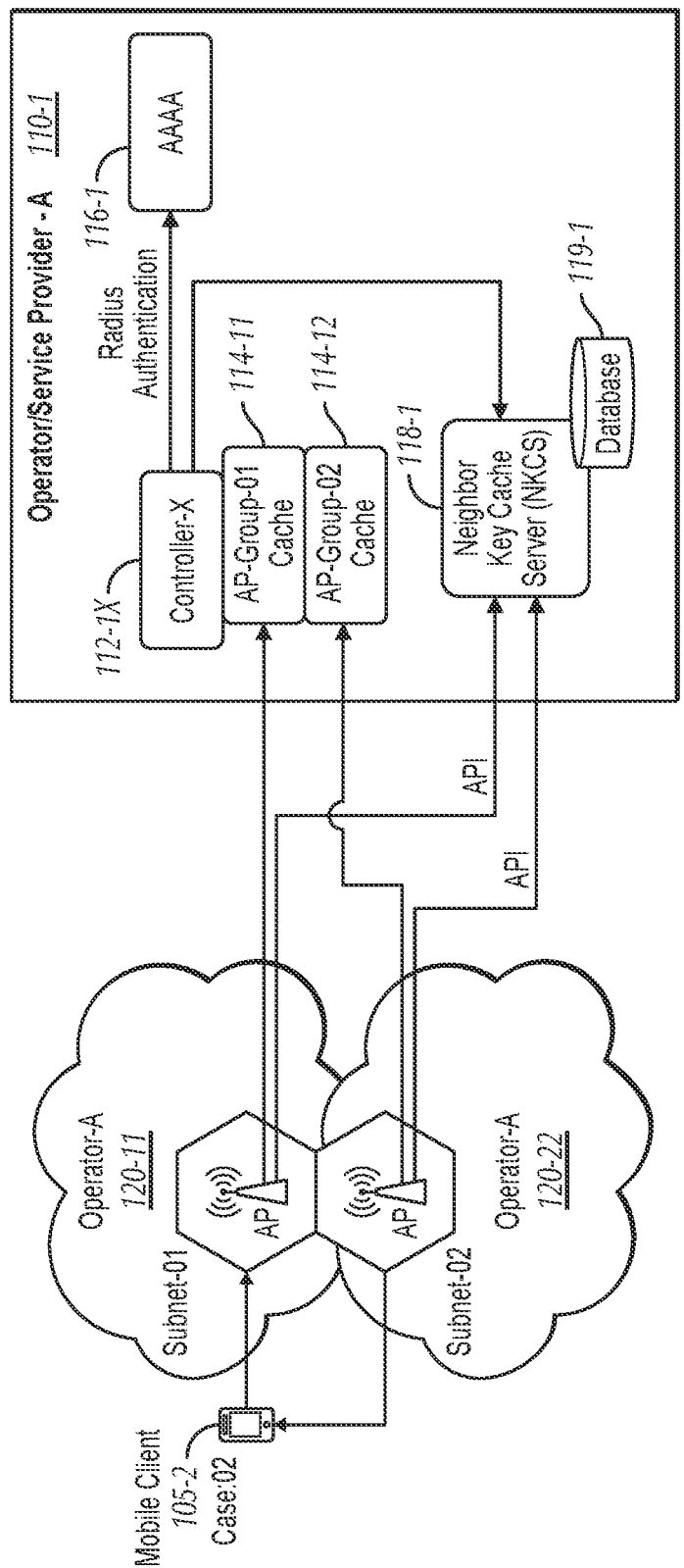
FIG. 2 depicts a graphical representation of a network operator control mechanism according to an embodiment.

FIG. 2 depicts a graphical representation of a network operator control mechanism according to an embodiment and suitable for use in addressing the first two scenarios described above (1) and (2). In particular, FIG. 2 depicts the first NM 110-1 described above with respect to FIG. 1 as further including a neighbor key cache server (NKCS) 118-1 operably coupled to a database 119-1 and a controller 112-1X, which is depicted as managing two AP groups 120-11 and 120-22, each of which uses a respective local key cache 114-11 and 114-12. FIG. 2 also depicts a client device 105-2 connected to a present serving AP (AP-2-1) in the second region 120-22 and selecting a target AP (AP-1-3) in the third region 120-33.

The NKCS 118 is a dynamic key cache for storing key cache data generated via enhanced techniques in neighbor detection, enhanced key search (e.g., via client key identifiers) and reordering of the keys stored in the database 119 in accordance to, illustratively, potential subscriber/client device 105 mobility using heuristics. The NKCS 118 and database 119 provide a vendor agnostic solution aggregating key cache data for APs managed by different regions, groups, controllers, or inter MSO roaming partnerships. The NKCS 118 and database 119 retrieve and store key cache data derived from enhanced neighbor detection in accordance with service providers details provided by neighbor Access Points, and added intelligence to detect the neighbor APs management domain.

Generally speaking, each AP reports and updates its list of neighbor APs to a centralized server. When a subscriber or client device is authenticated on a secured network serviced by the AP, the authentication will persist for a "key validity period" so as to later provide (within the key validity period) the required keys for reauthentication of the subscriber or client device in different scenarios such as roaming to neighbor APs or reassociating to a previously associated AP. In the roaming case, when a device is attempting to associate with a target AP (from the list of neighbor APs reported to the device from a centralized server), the target AP/controller uses the information received from the device to check with a centralized cache server for any keys stored for that device so as to enable fast reauthentication. If a key associated with that device exists, then the target AP/controller will use the key for faster reauthentication instead of executing a full authentication of the device with an external authentication server.

In operation, the NKCS 118 and database 119 are configured to dynamically maintain the key information required to complete fast reauthentication on overlapped APs managed by different AP groups on same controller 112 operated by same service providers.

APs share their neighbor reports (e.g., prepared using 802.11k) based on SSID match to controller Note these reports primarily meant to share with Wi-Fi client device upon request by client device. But in this case we are trying to use in identifying the neighbor APs beyond AP group on same controller boundaries.

Controllers 112 process the neighbor reports and conclude (using operator AP inventory database or its local AP inventory) that the neighbor AP is on same controller but managed by a different AP group of the same service provider. When a controller 112 learns of potential neighbor APs on boundaries of an inter-AP group for mobility, it registers basic details about the neighbor APs and its own details with the NKCS 118.

The NKCS 118 may continuously reorder the key cache entries based on subscriber roaming patterns and heuristics to speed up the key search and complete the reauthentication in less amount of time.

Figure 3A:
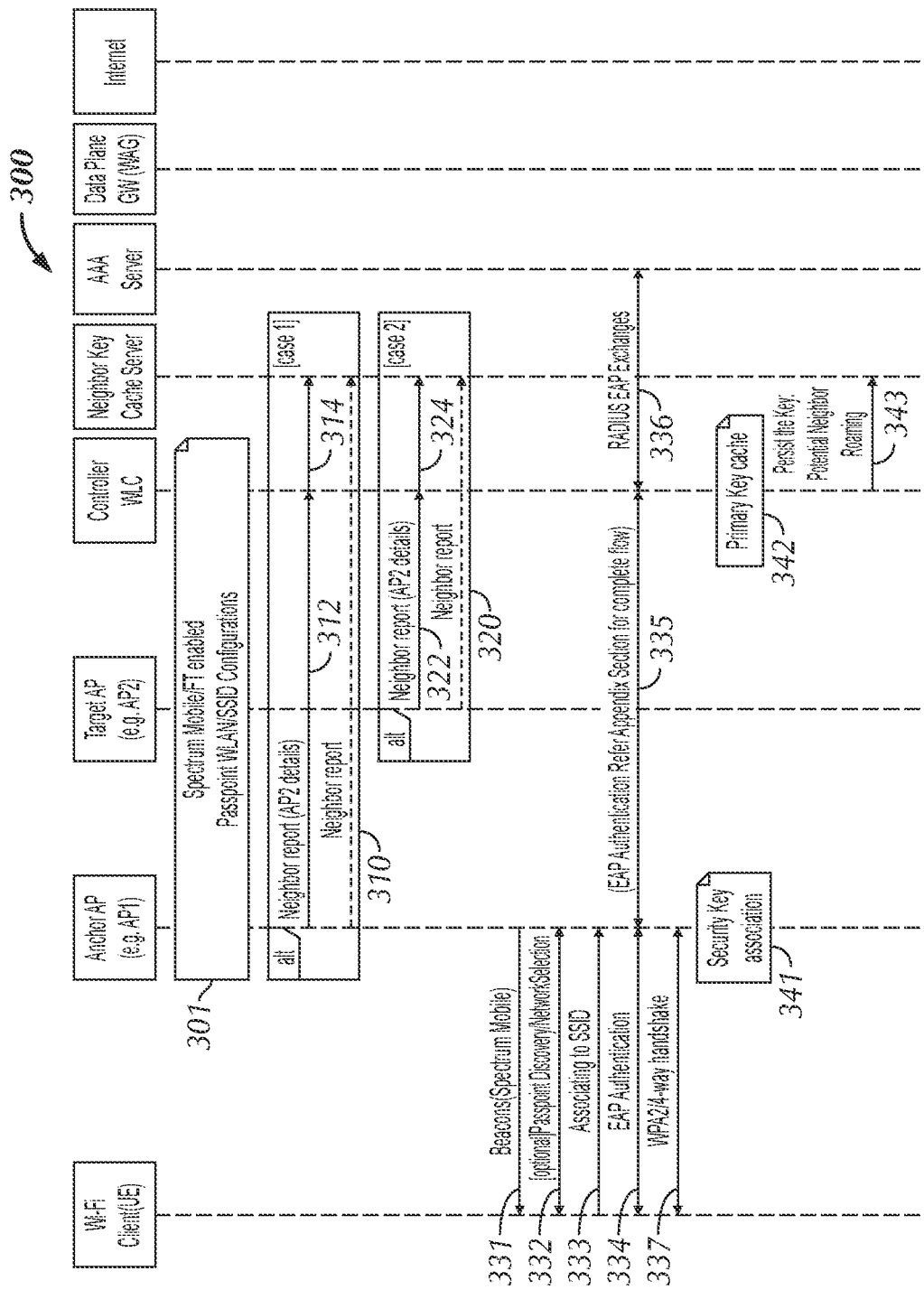
FIGS. 3(a)-3(b) together depict a flow diagram of common controller, inter-group AP mobility method according to an embodiment.
Figure 3B:
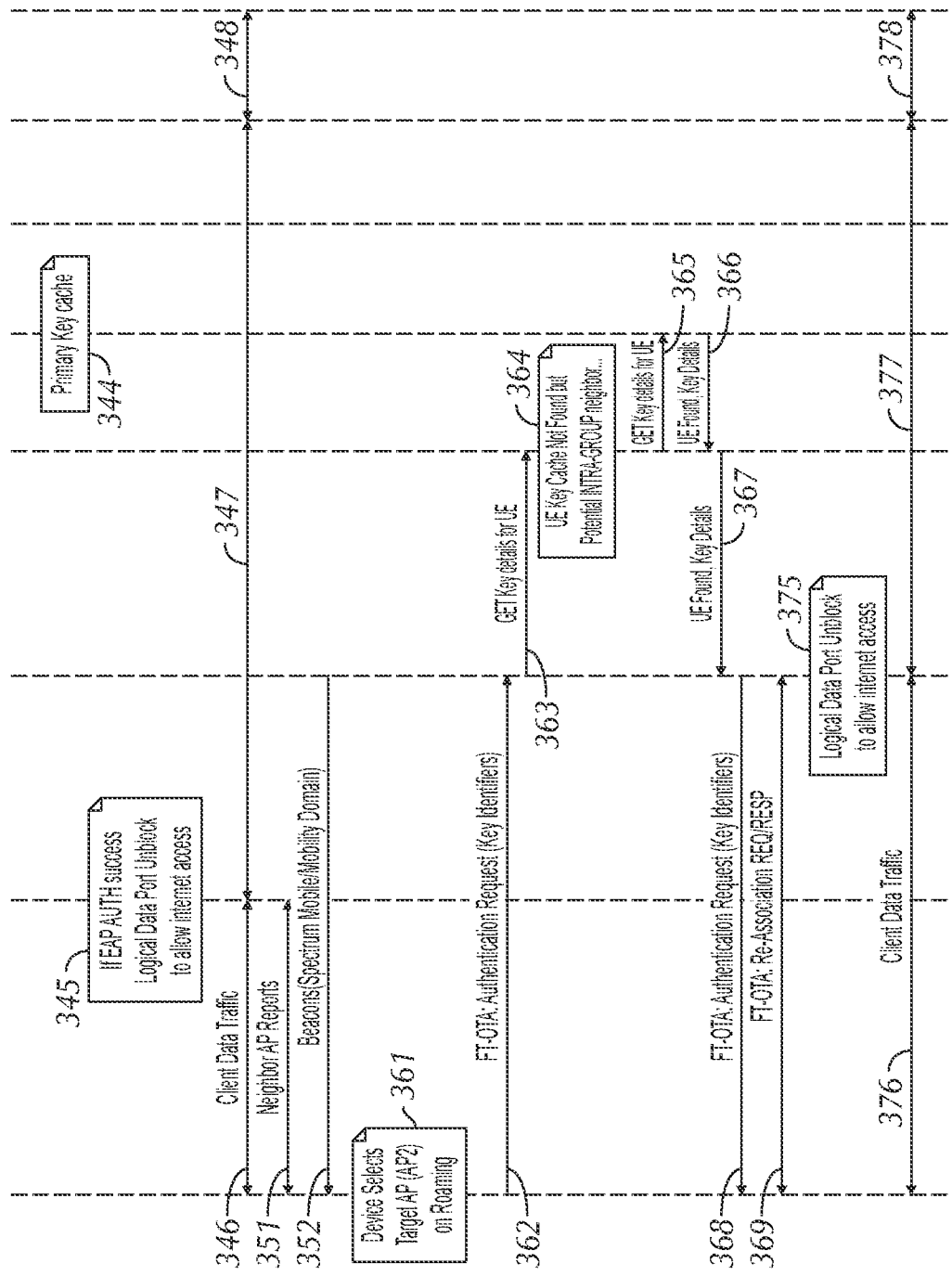

FIG. 3 depicts a flow diagram of common controller, inter-group AP mobility method according to an embodiment. In particular, FIG. 3 depicts communications between a client device 105 and various provider equipment (PE) network elements; namely, an anchor AP to which the client device is presently associated $AP_A$, a target AP to which the client device would like to become associated $AP_T$, a controller 112-1X, a neighbor key cache server (NKCS) 118, an AAA server 116, a data plane gateway GW, and the internet NET.

It is assumed that a subscriber with a client device 105 has tried to associate on home network AP (e.g. AP in Region-01), and that the client device 105 has completed a full authentication, and that the authentication keys associated with this authentication have been noted by the controller 112 and stored in the local key cache. It is noted that AP associated with a different AP group will be managed by the controller of that different AP group. However, the controllers of each AP group utilize the same NKCS so as to share, between the two AP groups, client authentication data and enable thereby fast reauthentication on neighbor AP managed by other controller.

It is noted that the NKCS may reorder these key details based on probability of mobility factor, derived based real time data as well as heuristic patterns of subscriber mobility patterns. When subscriber device decided to roam, serving AP may suggest and include proper target AP. The client device may use fast roaming protocols (802.11r) towards Target AP (e.g., AP in Region-02). As this AP aware of its existence in potential inter group service coverage overlap, it will check NKCS and retrieves the key details required to complete fast reauthentication. If for any reason the client device/key is not found in the local key cache or the NKCS, or is invalid due to time expiry, then the target AP will continue with a regular full RADIUS authentication flow.

Referring to FIG. 3, at optional step 301, the various PE elements are configured such as via Passpoint WLAN/SSID configuration procedures. For example, the controller 112 may be configured to use the NKCS 118 using DHCP or DNS or manual configurations during initial boot procedures. The various APs use regular neighbor discovery procedures (e.g., 802.11k/v) to learn of potential neighbor APs for mobility across inter-AP groups (i.e., AP groups managed by same service provider) on same SSID. The controller 112 will register basic details about the neighbor APs and its own details in the NKCS 118.

Step 310 depicts the anchor $AP_A$ providing (312) a neighbor report to the controller 112, which forwards (314) at least a relevant portion the report to the NKCS 118 for storage.

Step 320 depicts the target $AP_T$ providing (322) a neighbor report to the controller 112, which forwards (324) at least a relevant portion the report to the NKCS 118 for storage.

Steps 331-346 depict initial association of the client device 105 with the anchor AP. Specifically, the broadcasts a beacon (331) and, optionally, a Passpoint Discovery/Network Selection signal (332) which the client device 105 receives and, in response, requests association to the SSID of the anchor AP.

Full EAP authentication signaling between the client device 105 and anchor $AP_A$ (334) and controller 112 (335) and AAA 116 (336) result in communication between the client device 105 and anchor $AP_A$ 337 and establishment (341) of an authentication key for the client device association with the anchor $AP_A$. This authentication key is known to the controller 112 (342) and stored in the local key cache 114 associated with the AP group including the anchor $AP_A$, as well as provided (343) to the NKCS 118 so it may persist (344) for a period of time. At this point, client data traffic may flow (346-348) to the client 105 via the anchor $AP_A$.

In response to, for example, the client device requesting (351) a neighbor report from the anchor $AP_A$, the client device 105 (in this example) decides (361) to connect to the target $AP_T$, which is transmitting (352) a beacon.

An authentication request (362) from the client device 105 to the target $AP_T$ results in the target $AP_T$ requesting the authentication key and other information of the client device 105 from the controller 112, which then searches the local key cache (e.g., via client key identifiers) for the requested information. In this example, since the target $AP_T$ is in a different AP group/region than the anchor $AP_A$, the controller 112 will search (364) the local key cache of the target $AP_T$ group/region and not find the requested authentication key and other information of the client device 105. However, the controller 112 will then request (365) that the NKCS 118 search using a corresponding client key identifier for the authentication key and other information pertaining to the client device 105, where the information will be found and then provided (366) to the controller 112, which will in turn provide the authentication key and other information of the client device 105 to the target $AP_T$ (367). The target $AP_T$ will signal (368) and affirmative authentication response to the client device 105, which will then associate itself (369) with the target $AP_T$, which will allow (375) data access thereto (376-378).

In this manner, the use of the NKCS 118 enables the passing of keys and other information between APs of different AP groups/regions where there is a common controller 112 for the AP groups/regions.

Figure 4:
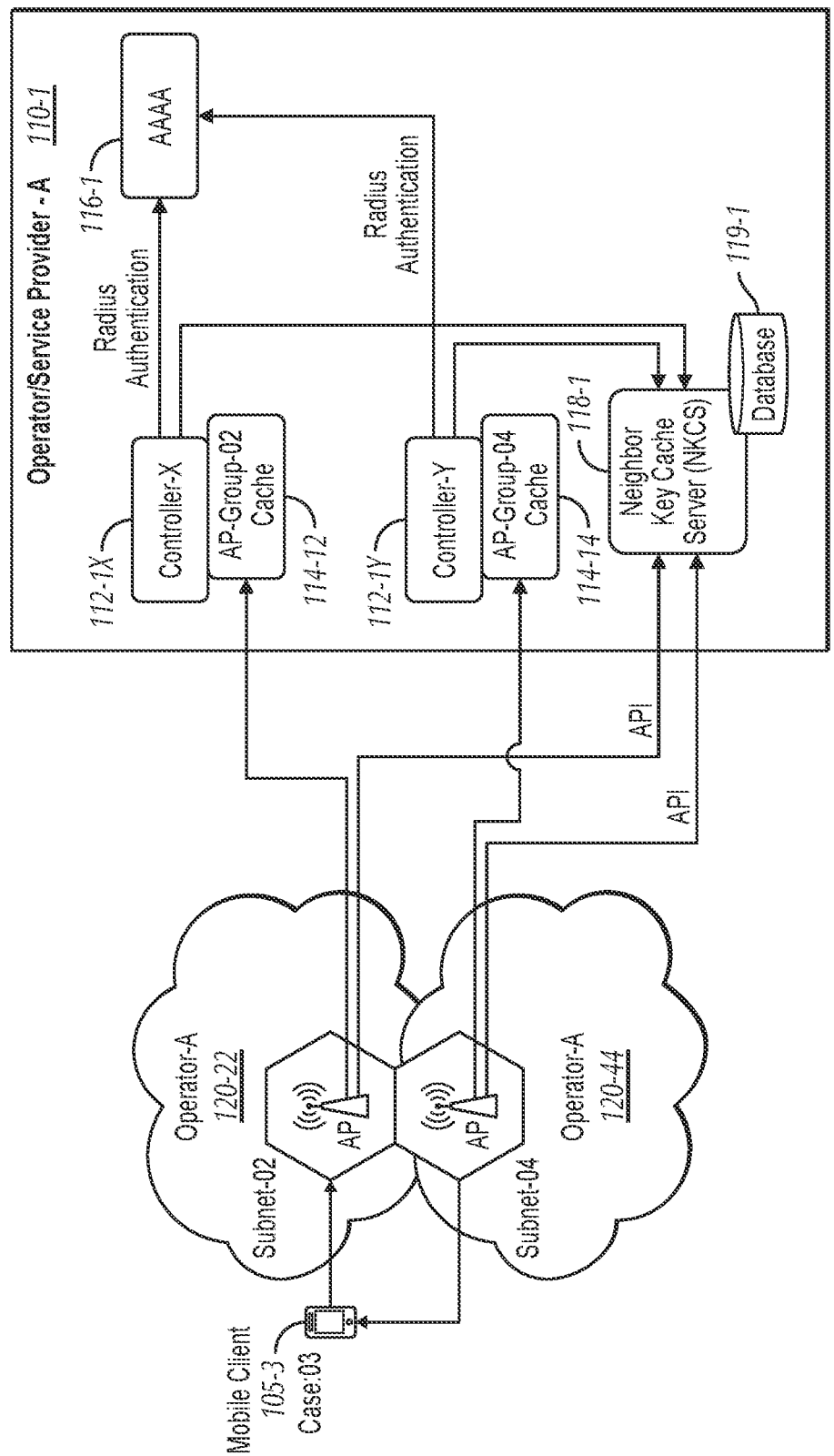
FIG. 4 depicts a graphical representation of a network operator control mechanism according to an embodiment.

FIG. 4 depicts a graphical representation of a network operator control mechanism according to an embodiment and suitable for use in addressing the third scenario described above, namely (3) client device mobility inter-AP group/region with different controllers (different regions of an Operator, each region managed by a respective controller of the same operator). In particular, FIG. 4 depicts the first NM 110-1 described above with respect to FIG. 1 as further including a neighbor key cache server (NKCS) 118-1 operably coupled to the controller 112-1X, the controller 112-1Y, and a database 119-1.

In particular, FIG. 4 depicts the first NM 110-1 described above with respect to FIG. 1 as further including a neighbor key cache server (NKCS) 118-1 operably coupled to a database 119-1, a first controller 112-1X managing AP group 120-22 and using local key cache 114-12, and a second controller 112-1Y managing AP group 120-44 and using local key cache 114-14. FIG. 4 also depicts a client device 105-3 connected to a present serving AP in the fourth region 120-44 and selecting a target AP in the second region 120-22.

The arrangement of FIG. 4 differs from that of FIG. 2 primarily in that each of the two controllers 112-1Z and 112-1Y are able to store in the NKCS 118 information pertaining to APs within their respective managed AP groups 120-22 and 120-44 that are proximate to APs in the other AP groups 120-44 and 120-22, respectively. As such, mobility between AP groups having different controllers 112 is improved in a manner similar to that of mobility between different AP groups having a common controller as discussed above with respect to FIGS. 2-3.

Figure 5A:
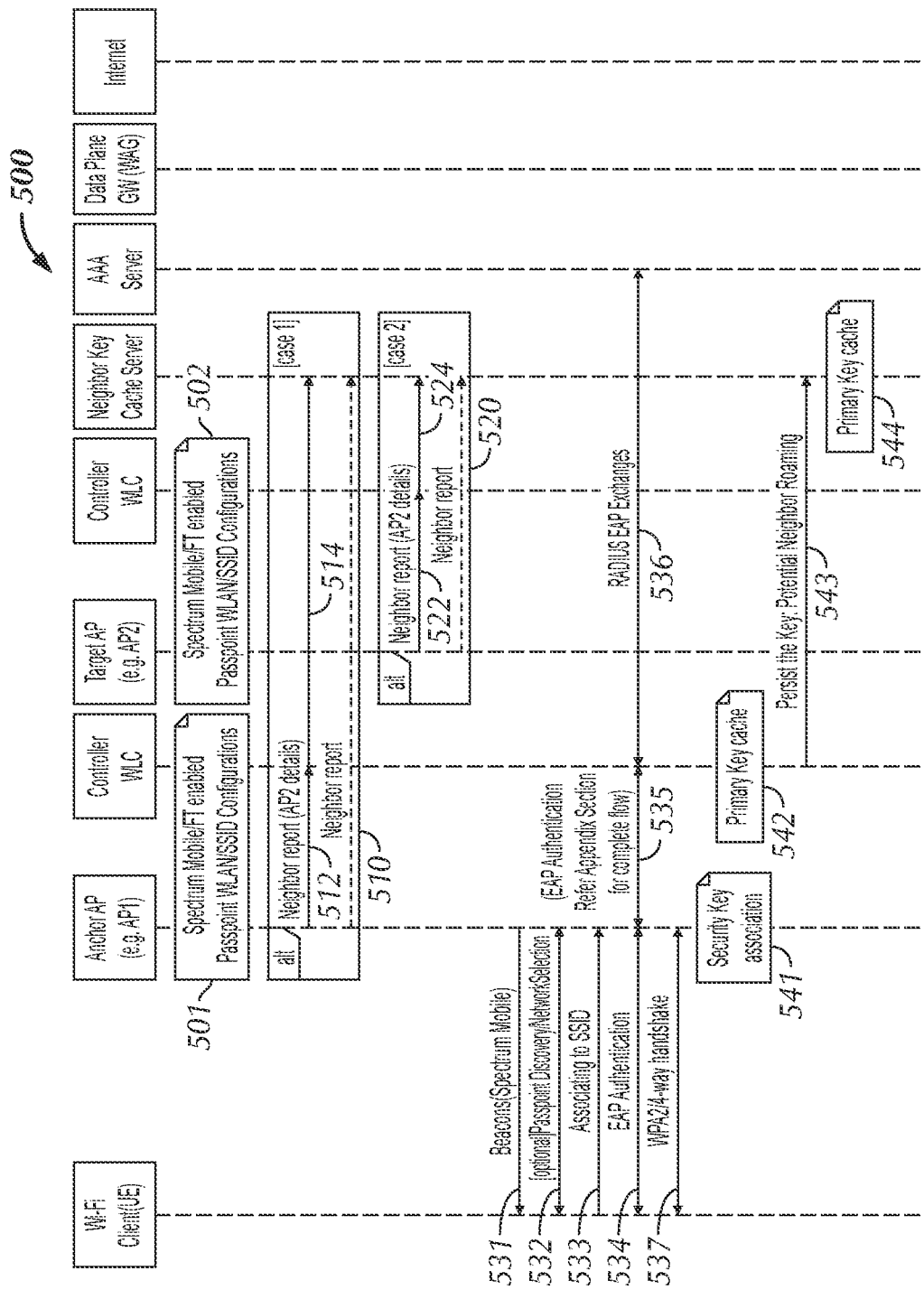
FIGS. 5(a)-5(b) together depict a flow diagram of common operator, different controller, inter-group AP mobility according to an embodiment.
Figure 5B:
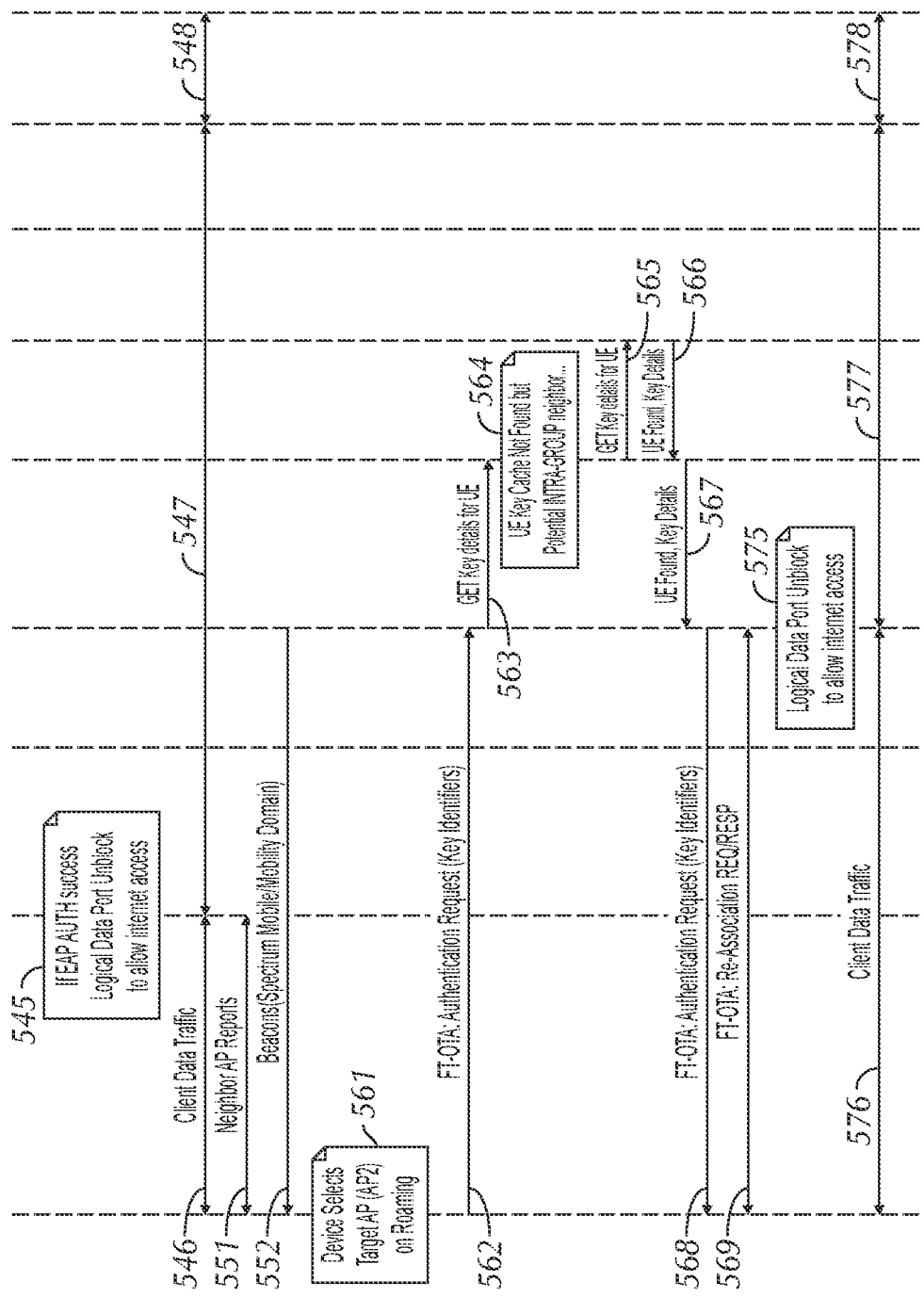

FIG. 5 depicts a flow diagram of common operator, different controller, inter-group AP mobility according to an embodiment. In particular, FIG. 5 depicts communications between a client device 105 and various provider equipment (PE) network elements; namely, an anchor AP in group 120-22 to which the client device is presently associated $AP_A$, a target AP in group 120-44 to which the client device would like to become associated $AP_T$, respective group controllers 112-1X/112-1Y, a neighbor key cache server (NKCS) 118, an AAA server 116, a data plane gateway GW, and the internet NET.

It is assumed that a subscriber with a client device 105 has tried to associate on home network AP (e.g. AP in Region-02), and that the client device 105 has completed a full authentication, and that the authentication keys associated with this authentication have been noted by the controller 112-1X and stored in the local key cache 114-12. It is noted that AP associated with a different AP group will be managed by the controller of that different AP group, in this case a different controller 112-1Y. However, the controllers of each AP group utilize the same NKCS so as to share, between the two AP groups and between the two controllers 112, client authentication data and enable thereby fast reauthentication on neighbor AP managed by the other controller.

It is noted that the NKCS may reorder these key details based on probability of mobility factor, which in various embodiments is derived based on real time data and/or heuristic patterns of subscriber mobility patterns. When subscriber device decided to roam, serving AP may suggest and include proper target AP. The client device may use fast roaming protocols (802.11r) towards Target AP (e.g., AP in Region-04). As this AP aware of its existence in potential inter group service coverage overlap, it will check NKCS and retrieves the key details required to complete fast reauthentication. If for any reason the client/device key is not found in the local key cache 114 or the NKCS, or is invalid due to time expiry, then the target AP will continue with a regular full RADIUS authentication flow.

Referring to FIG. 5, at optional steps 501/502, the various PE elements are configured such as via Passpoint WLAN/SSID configuration procedures. For example, the controllers 112-1X and 112-1Y may be configured to use the NKCS 118 using DHCP or DNS or manual configurations during initial boot procedures. The various APs use regular neighbor discovery procedures (e.g., 802.11k/v) to learn of potential neighbor APs for mobility across inter-AP groups (i.e., AP groups managed by same service provider) on same SSID. The controllers 112-1X and 112-1Y will register basic details about their respective neighbor APs and their own details in the NKCS 118.

Step 510 depicts the anchor $AP_A$ providing (512) a neighbor report to the controller 112-1X, which forwards (514) at least a relevant portion the report to the NKCS 118 for storage.

Step 520 depicts the target $AP_T$ providing (522) a neighbor report to the controller 112-1Y, which forwards (524) at least a relevant portion the report to the NKCS 118 for storage.

Steps 531-546 depict initial association of the client device 105 with the anchor AP. Specifically, the broadcasts a beacon (531) and, optionally, a Passpoint Discovery/Network Selection signal (532) which the client device 105 receives and, in response, requests association to the SSID of the anchor $AP_A$.

Full EAP authentication signaling between the client device 105 and anchor $AP_A$ (534) and controller 112-1X (535) and AAA 116 (536) result in communication between the client device 105 and anchor $AP_A$ 537 and establishment (541) of an authentication key for the client device association with the anchor $AP_A$. This authentication key is known to the controller 112-1X (542) and stored in the local key cache 114-12 associated with the AP group including the anchor $AP_A$, as well as provided (543) to the NKCS 118 so it may persist (544) for a period of time. At this point, client data traffic may flow (546-548) to the client 105 via the anchor $AP_A$.

In response to, for example, the client device requesting (551) a neighbor report from the anchor $AP_A$, the client device 105 (in this example) decides (561) to connect to the target $AP_T$, which is transmitting (552) a beacon.

An authentication request (562) from the client device 105 to the target $AP_T$ results in the target $AP_T$ requesting the authentication key and other information of the client device 105 from the controller 112-1Y, which then searches the local key cache 114-14 (e.g., via client key identifier) for the requested information. In this example, since the target $AP_T$ is in a different AP group/region than the anchor $AP_A$, the controller 112-1Y will search (564) the local key cache 114-14 of the target $AP_T$ group/region and not find the requested authentication key and other information of the client device 105. However, the controller 112-1Y will then request (565) that the NKCS 118 search for the authentication key and other information of the client device 105, where the information will be found and then provided (566) to the controller 112-1Y, which will in turn provide the authentication key and other information of the client device 105 to the target $AP_T$ (567). The target $AP_T$ will signal (568) and affirmative authentication response to the client device 105, which will then associate itself (569) with the target $AP_T$, which will allow (575) data access thereto (576-578).

In this manner, the use of the NKCS 118 enables the passing of keys and other information between APs of different AP groups/regions where there are different controllers 112-1X and 112-1Y for the different AP groups/regions.

Figure 6:
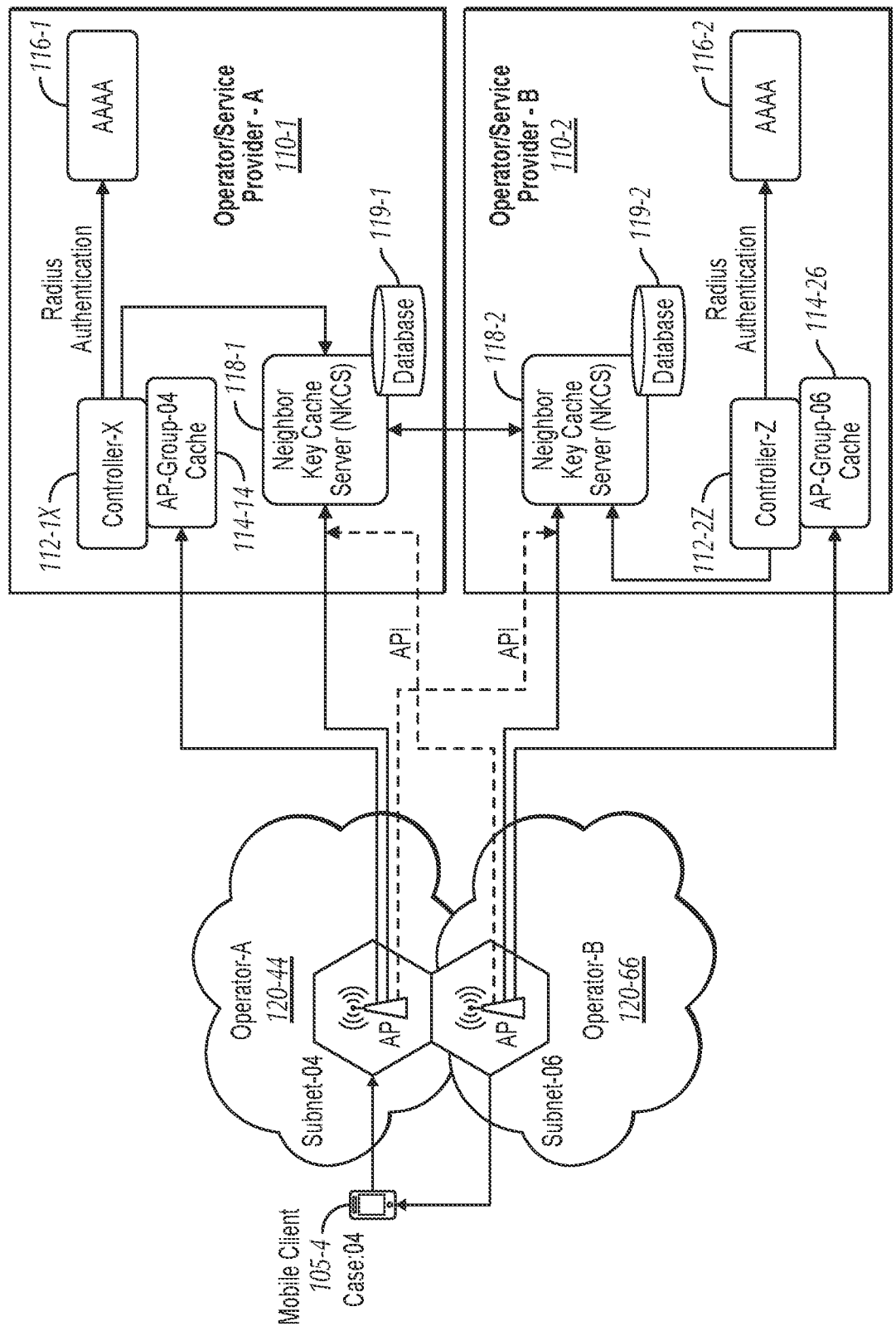
FIG. 6 depicts a graphical representation of a network operator control mechanism according to an embodiment.

FIG. 6 depicts a graphical representation of a network operator control mechanism according to an embodiment and suitable for use in addressing the fourth scenario described above, namely (4) client device mobility in inter-AP Group from different Operators acting as Wi-Fi roaming partners (different regions, each region associated with a respective Operator and therefore managed by a different controller).

In particular, FIG. 6 depicts the first NM 110-1 described above with respect to FIG. 1 as further including a neighbor key cache server (NKCS) 118-1 operably coupled to a database 119-1, and a controller 112-1X managing AP group 120-44 and using local key cache 114-14. FIG. 6 also depicts the second NM 110-2 described above with respect to FIG. 1 as further including a neighbor key cache server (NKCS) 118-2 operably coupled to a database 119-2, and a controller 112-2Z managing AP group 120-66 and using a local key cache 114-26. Further, NKCS 118-1 is operably coupled to NKCS 118-2 so as to share information therebetween.

FIG. 6 also depicts a client device 105-4 connected to a present serving AP in the fourth region 120-44 and selecting a target AP in the sixth region 120-66.

The arrangement of FIG. 6 differs from that of FIG. 4 primarily in that each of the two controllers 112-1X and 112-2Z are associated with different Operators/Service Providers, each NM 110 having a respective NKCS 118, and the NKCS 118-1 of NM-110-1 being communicatively coupled to the NKCS 118-2 of NM-110-2 to thereby provide a third cache to potentially store authentication keys and thereby avoid a full AAA/RADIUS authentication of a client device 105.

Figure 7A:
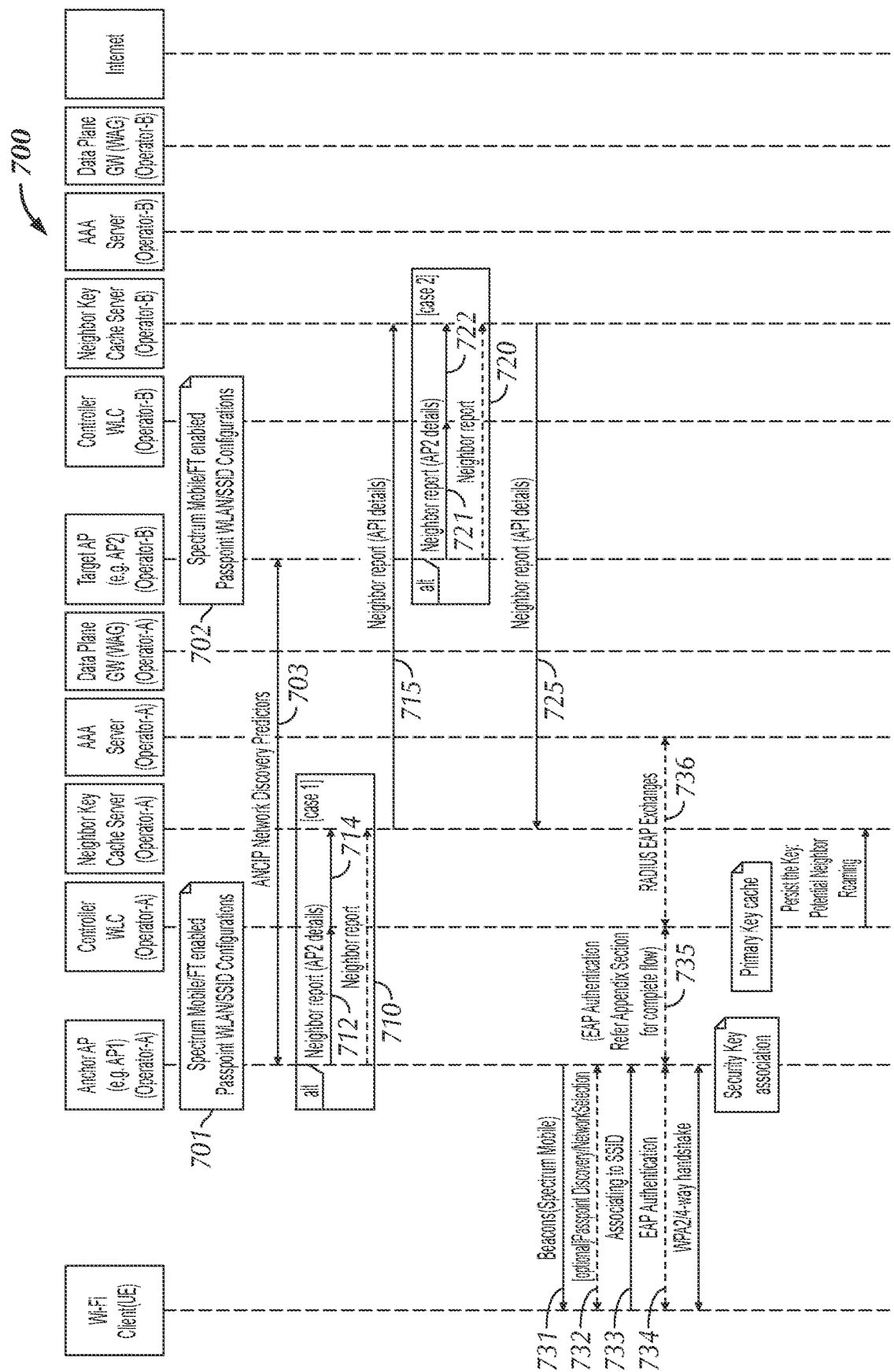
FIGS. 7(a)-7(b) together depict a flow diagram of different operator, different controller, inter-group AP mobility according to an embodiment.
Figure 7B:
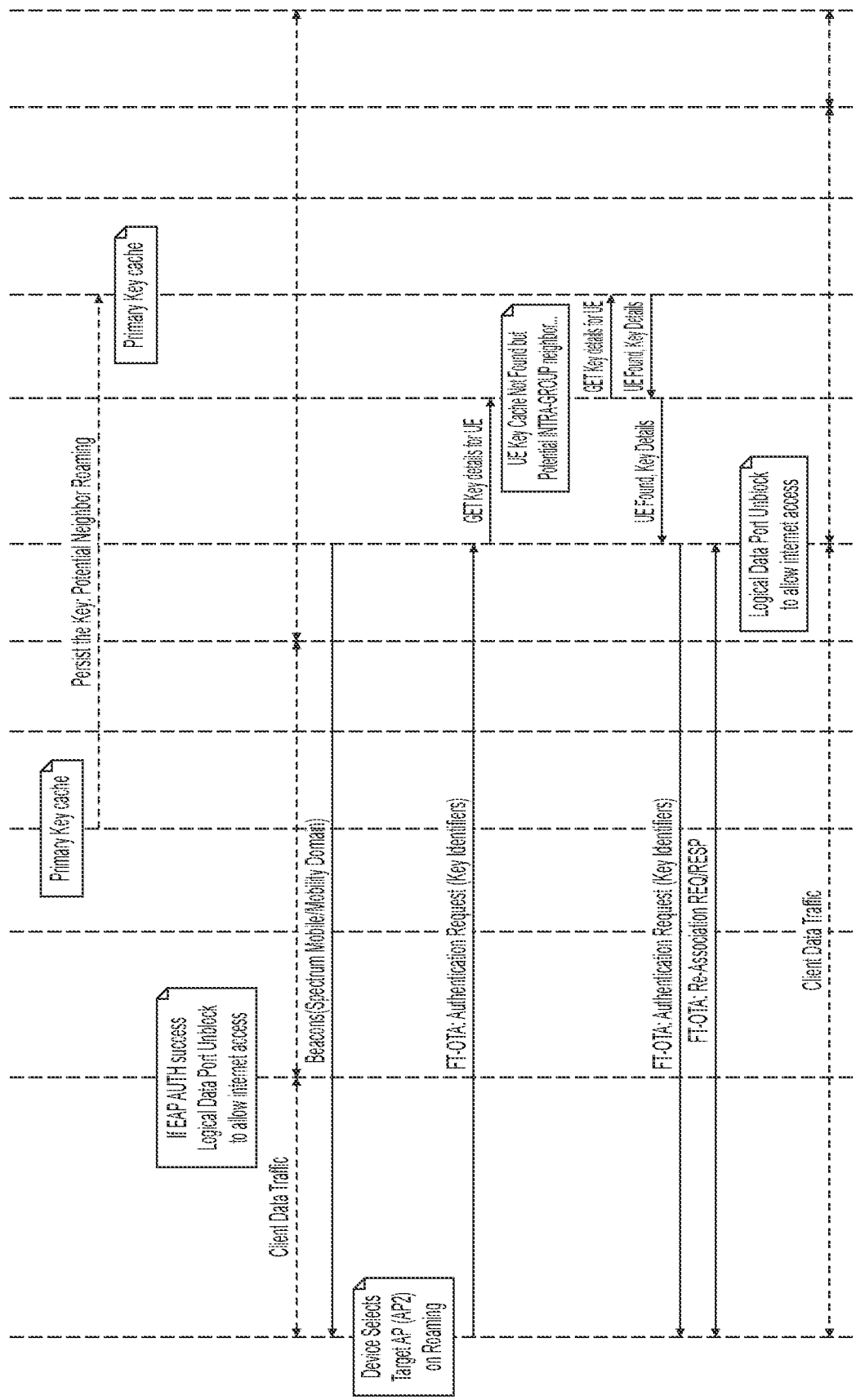

FIG. 7 depicts a flow diagram of different operator, different controller, inter-group AP mobility according to an embodiment. In particular, FIG. 7 depicts communications between a client device 105 and various provider equipment (PE) network elements; namely, an anchor AP in group 120-44 to which the client device is presently associated $AP_A$, a target AP in group 120-66 to which the client device would like to become associated $AP_T$, respective group controllers 112-1X of NM 110-1 and 112-2Z of NM 11-2, respective neighbor key cache servers (NKCSs) 118-1 of NM 110-1 and 118-2 of NM 110-2, an AAA server 116, a data plane gateway GW, and the internet NET.

It is assumed that a subscriber with a client device 105 has tried to associate on home network AP (e.g. AP in Region-44), and that the client device 105 has completed a full authentication, and that the authentication keys associated with this authentication have been noted by the controller 112-1X of Operator A and stored in the local key cache 114-14. It is noted that AP associated with a different AP group of a different Operator will be managed by the controller of that different Operator's AP group, in this case a different controller 112-1Z of Operator B. Further, the controllers 112 of each Operator utilize a respective NKCS 118 which are in communication with each other so as to share, between the two AP groups of the different operators A and B, and between their respective controllers 112, client authentication data and enable thereby fast reauthentication on neighbor AP managed by the other Operator's controller.

It is noted that each NKCS may reorder these key details based on probability of mobility factor, derived based real time data as well as heuristic patterns of subscriber mobility patterns. When subscriber device decided to roam, serving AP may suggest and include proper target AP. The client device may use fast roaming protocols (802.11r) towards Target AP (e.g., AP in Region-04). As this AP aware of its existence in potential inter group service coverage overlap, it will check NKCS and retrieves the key details required to complete fast reauthentication. If for any reason the client/device key is not found in the local key cache 114 or the NKCS, or is invalid due to time expiry, then the target AP will continue with a regular full RADIUS authentication flow.

Referring to FIG. 7, at optional steps 701/702, the various PE elements are configured such as via Passpoint WLAN/SSID configuration procedures. For example, the controllers 112-1X and 112-1Y may be configured to use the NKCS 118 using DHCP or DNS or manual configurations during initial boot procedures. Different operators operate Wi-Fi services using different WLAN/SSID names, and existing 802.11k/v based neighbor report data collection is not possible. However, various embodiments enable the generation of neighbor reporting using realm/network access identifiers such as for roaming partnerships that exist between operators/service providers. For example, in some embodiments an $AP_A$ of a first operator A proximate an APB of a second provider B is configured to discover such proximity by monitoring broadcast frames and 802.11u frames associated with any APs proximate $AP_A$. The realm and/or network access identifiers of the monitored broadcast frames are provided by $AP_A$ to the controller 112 associated with $AP_A$, which in turn identifies one or more of the proximate APs as associated with another provider and responsively updates the NKCS 118 of operator A to reflect these inter-realm neighbor node/AP relationships.

The various APs use regular neighbor discovery procedures (e.g., 802.11k/v) to learn of potential neighbor APs for mobility across inter-AP groups (i.e., AP groups managed by same service provider) on same SSID. The controllers 112-1X and 112-1Y will register basic details about their respective neighbor APs and their own details in the NKCS 118.

Step 710 depicts the anchor $AP_A$ providing (712) a neighbor report to the controller 112-1X of Operator A, which forwards (714) at least a relevant portion the report to the NKCS 118-1 for storage.

Step 720 depicts the target $AP_T$ providing (722) a neighbor report to the controller 112-1Z of Operator B, which forwards (724) at least a relevant portion the report to the NKCS 118-2 for storage.

Steps 731-746 depict initial association of the client device 105 with the anchor AP. Specifically, the broadcasts a beacon (731) and, optionally, a Passpoint Discovery/Network Selection signal (732) which the client device 105 receives and, in response, requests association to the SSID of the anchor $AP_A$.

Full EAP authentication signaling between the client device 105 and anchor $AP_A$ (734) and controller 112-1X (735) and AAA 116 (736) result in communication between the client device 105 and anchor $AP_A$ 737 and establishment (741) of an authentication key for the client device association with the anchor $AP_A$. This authentication key is known to the controller 112-1X (742) and stored in the local key cache 114-14 associated with the AP group including the anchor $AP_A$, as well as provided (743) to the NKCS 118-1 so it may persist (744) for a period of time. At this point, client data traffic may flow (746-748) to the client 105 via the anchor $AP_A$.

In response to, for example, the client device requesting (751) a neighbor report from the anchor $AP_A$, the client device 105 (in this example) decides (761) to connect to the target $AP_T$, which is transmitting (752) a beacon.

An authentication request (762) from the client device 105 to the target $AP_T$ results in the target $AP_T$ requesting the authentication key and other information of the client device 105 from the controller 112-2Z, which then searches the local key cache 114-26 (e.g., via client key identifiers) for the requested information. In this example, since the target $AP_T$ is in a different AP group/region than the anchor $AP_A$, the controller 112-2Z will search (764) the local key cache 114-26 of the target $AP_T$ group/region and not find the requested authentication key and other information of the client device 105. However, the controller 112-2Z will then request (765) that the NKCS 118-2 search for the authentication key and other information of the client device 105. In this example, since the target $AP_T$ is associated with an entirely different Operator than the anchor $AP_A$, the NKCS 118-2 search will also not find the requested authentication key and other information of the client device 105. However, the controller 112-2Z or NKCS 118-2 of Operator B will request (765) that the NKCS 118-1 of Operator A then search for the authentication key and other information of the client device 105, where the information will be found and then provided (766) to the controller 112-2Z, which will in turn provide the authentication key and other information of the client device 105 to the target $AP_T$ (767). The target $AP_T$ will signal (768) and affirmative authentication response to the client device 105, which will then associate itself (769) with the target $AP_T$, which will allow (775) data access thereto (776-778).

In this manner, the use of the Operator A NKCS 118-1 by Operator B enables the passing of keys and other information between APs of different Operators, each having groups/regions associated with respective controllers 112-1X and 112-2Z.

FIG. 8 depicts a method according to an embodiment. Specifically, the method 800 of FIG. 8 is suitable for use by a controller 112 such as described above with respect to the various other figures. The controller 112 as described is operative to control one or more groups of access points (APs) of a wireless local area network (WLAN) service provider.

As generally described herein a group-specific key cache 114 is used for storing client authentication data and/or other association data for client devices associated with serving/target APs within the same AP group, while a NKCS is used for storing client authentication data and/or other association data for client devices associated with a serving AP in one AP group and a target AP in another group.

At step 810, the controller is operative to manage received client device authentication data, keys, neighbor reports and the like, by performing the following:

Receive authentication data for each client device associated with a presently serving AP within a managed AP group and store the received authentication data within a respective group key cache of the presently serving AP group. The authentication data for a client device associated with a presently serving AP may be received during an initial authentication of the client device by an authentication, authorization and accounting (AAA) server. This initial authentication of the client device by the AAA server may comprise an Extensible Authentication Protocol (EAP) authentication.

Further, the controller is operative to receive neighbor reports (e.g., IEEE 802.11k neighbor reports) from APs in each AP group managed by the controller, wherein each neighbor report may identify for a reporting AP any APs proximate the reporting AP such that the controller may then identify those reporting APs proximate APs that are not members of the group of APs including the reporting AP (e.g., APs from a different group of the same Operator, or APs of a different Operator entirely). Such identification may be performed using an inventory of deployed APs within each managed AP group so as to identify APs proximate reporting APs that are not members of the group of APs including the reporting APs. The controller stores, in a neighbor key cache server (NKCS), authentication data for each client device associated with a serving AP proximate an AP that is not a member of the group of APs including the serving AP.

Further, the resulting NKCS may be periodically optimized as described herein. For example, methods for periodic optimization of the NKCS may comprises time of day key queue optimization, most recent session optimization, session purging optimization, and/or other optimization methods.

In some embodiments, time of day key queue optimization may be used to maintain key mapping for client roaming patterns based on heuristics and wireless coverage overlap. As an example, morning and evening busy hours subscribers crossing the coverage boundaries while commuting to/from work.

In some embodiments, most recent session optimization may be used to keep keys and related information pertaining to the most recent client device sessions at the top of a database search stack. This maintains key mapping for those client devices most recently authenticated and/or more likely to be candidates for roaming due to a present or recent service area being proximate a service area boundary.

In some embodiments, session purging optimization may be used to purge from the NKCS device and/or session keys that are older (were stored) more than a time associated with an expiry timer.

At step 820, the controller is operative to manage received authentication key requests from target AP by performing the following:

In response to receiving a client device authentication request from an AP, searching the requesting AP group key cache using a client key identifier to find the corresponding authentication data, encryption keys, and the like. In response to identifying a key corresponding to the client device in the group key cache, the controller retrieves the identified key and transmits it toward the requesting AP to enable thereby authentication of the client device to the requesting AP. In response to not identifying a key corresponding to the client device in the group key cache, the controller performs a similar search in the NKCS using the client key identifier (rather than defaulting to a full AAA/RADIUS authentication procedure). In response to identifying a key corresponding to the client device in the NKCS, the controller retrieves the identified key and transmits it toward the requesting AP to enable thereby authentication of the client device to the requesting AP. If the authentication key is not found, then a full AAA/RADIUS authentication of the client device to the target AP may be needed.

Various embodiments discussed above provide mechanisms for caching and sharing client/device keys, session keys, and so on between APs of overlapping wireless networks operated by same operator but segmented for functional, operational, and/or management simplicity purposes, wherein neighbor reports data based on WLAN/SSID is reported to a centralized manager (e.g., NKCS) irrespective of a reporting AP's home region.

Various embodiments discussed above provide mechanisms for caching and sharing client/device keys, session keys, and so on between APs of overlapping wireless networks operated by different operators, wherein neighbor reports data based on WLAN/SSID is reported to respective centralized managers (e.g., respective operator NKCSs) irrespective of a reporting AP's home region.

Various elements or portions thereof depicted in FIG. 1 and having functions described herein are implemented at least in part as computing devices having communications capabilities, including for example access network elements such as APs and associated controllers 112, as well as the NKCSs 118 used to store keys for sharing between controllers of the same or different operators. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A computer-implemented method, in a controller managing at least one group of access points (APs) in a wireless local areal networks (WLAN) comprising a plurality of AP groups, each AP group being managed by a respective controller, the computer-implemented method comprising:
    at each AP group controller, receiving neighbor node information and keys utilized at currently serving APs within the respective AP group that are proximate APs within different AP groups, and storing the received neighbor node information and keys in a common Neighbor Key Cache Server (NKCS) configured for managing keys used to authenticate client devices to APs; and
    at each AP group controller, in response to receiving a client device authentication request from a managed AP proximate an AP within a different AP group, searching the common NKCS using a client key identifier of the client device to identify within the NKCS a corresponding client device key, and transmitting the identified client device key toward the requesting AP to enable thereby authentication of the client device to the requesting AP.

2. The computer-implemented method of claim 1, wherein the at least one group of APs in the WLAN are managed by a first Operator, the computer-implemented method further comprising:
    in response to not identifying the corresponding client device key within the NKCS, searching a NKCS of a second Operator using the client key identifier; and
    in response to identifying a key corresponding to the client device in the NKCS of the second Operator, transmitting the identified client device key toward the requesting AP to enable thereby authentication of the client device to the requesting AP.

3. The computer-implemented method of claim 1, wherein NKCS of the first Operator and the NKCS of the second operator are configured to receive neighbor node information and keys from respective WLAN group controllers, and to exchange at least neighbor node information and keys for respective APs proximate APs of both Operators.

4. The computer-implemented method of claim 1, further comprising receiving authentication data for a client device associated with a presently serving AP during an initial authentication of the client device by an authentication, authorization and accounting (AAA) server.

5. The computer-implemented method of claim 4, wherein the initial authentication of the client device by the AAA server comprises an Extensible Authentication Protocol (EAP) authentication.

6. The computer-implemented method of claim 1, wherein the neighbor node information comprises Institute of Electrical and Electronics Engineers (IEEE) 802.11k neighbor reports from at least intra-operator network segments.

7. The computer-implemented method of claim 6, wherein the neighbor reports further comprise IEEE 802.11k neighbor reports from at inter-operator network segments.

8. The computer-implemented method of claim 1, wherein an inventory of deployed APs within each managed AP group is used to identify APs proximate neighbor node information reporting APs that are not members of the group of APs including the neighbor node information reporting APs.

9. The computer-implemented method of claim 1, wherein an AP that is not a member of the group of APs including currently serving APs comprises an AP in a different group of the same WLAN Operator.

10. The computer-implemented method of claim 1, wherein the AP that is not a member of the group of APs including currently serving APs comprises an AP of a different WLAN Operator.

11. The computer-implemented method of claim 1, wherein the NKCS comprises a WLAN service provider NKCS configured to store client device authentication data for APs from each of a plurality of AP groups of the WLAN service provider NKCS.

12. The computer-implemented method of claim 11, wherein the neighbor node information includes data based on WLAN/SSID from APs associated with each of a plurality of AP home regions of the WLAN service provider NKCS.

13. The computer-implemented method of claim 1, wherein the NKCS is configured exchange client device authentication data with at least one NKCS associated with a different WLAN Operator.

14. The computer-implemented method of claim 1, wherein each AP is configured to detect neighbor AP WLAN/SSID information.

15. The computer-implemented method of claim 1, wherein each AP is configured to detect neighbor AP realm/Network Access Identifier information.

16. The computer-implemented method of claim 1, wherein each AP is configured to detect APs of overlapping roaming partner WLANs using IEEE 802.11u Access Network Query Protocol (IEEE 802.11u, ANQP).

17. The computer-implemented method of claim 16, wherein each roaming partner WLAN is associated with a respective NKCS, the computer-implemented method further comprising exchanging key identifiers between roaming partner NKCSs.

18. The computer-implemented method of claim 17, wherein NKCS exchanging of the key identifiers is performed on a substantially real time basis.

19. The computer-implemented method of claim 1, wherein the NKCS is configured to store client device authentication data for APs from AP groups of a plurality of WLAN service providers.

20. The computer-implemented method of claim 6, wherein the IEEE 802.11K neighbor reports include data based on WLAN/SSID from APs associated with each of a plurality of AP home regions.

21. The computer-implemented method of claim 1, wherein at least a portion of the client devices are configured to implement advanced inter-operator fast roaming using realm/Network Access Identifiers.

22. The computer-implemented method of claim 1, wherein the NKCS is periodically optimized in accordance with a time of day key queue defined in response to client roaming patterns based on at least one of heuristics and wireless coverage overlap.

23. The computer-implemented method of claim 1, wherein the NKCS is periodically optimized in accordance with at least one of time since client device authentication and time since start of client device session.

24. The computer-implemented method of claim 1, wherein the NKCS is periodically optimized by purging session keys older than an expiry age.

25. A Neighbor Key Cache Server (NKCS) for managing keys used to authenticate client devices to access points (APs) in a wireless local areal networks (WLAN) comprising a plurality of AP groups, each AP group being managed by a respective controller, the NKCS comprising processing resources and non-transitory memory resources, the processing resources configured to execute software instructions stored in the non-transitory memory resources to provide thereby a key caching method, comprising:

receiving, from group controllers, neighbor node information and keys utilized at currently serving APs within respective AP groups that are proximate APs within different AP groups;

storing the received neighbor node information and keys; and in response to a controller request for a client device key, transmitting the client device key toward the requesting controller to enable an AP in the corresponding controlled AP group to authenticate the client device;

wherein the NKCS is configured exchange client device authentication data with AP group controllers associated with different WLAN service providers.

26. The NKCS of claim 25, wherein:

the NKCS is configured to receive the neighbor node information and the keys from group controllers associated with a first WLAN service provider, and to exchange client device authentication data with an NKCS associated with a second WLAN service provider.

* * * * *

UNITED STATES PATENT AND TRADEMARK OFFICE
CERTIFICATE OF CORRECTION

PATENT NO. : 12,212,962 B2  
APPLICATION NO. : 17/703364  
DATED : January 28, 2025  
INVENTOR(S) : Venkata Divvi et al.

Page 1 of 2

It is certified that error appears in the above-identified patent and that said Letters Patent is hereby corrected as shown below:

In the Claims (Column 19, Lines 22 - 43 – Claim 1):
Currently Reads:
"1. A computer implemented method, in a controller managing at least one group of access points (APs) in a wireless local areal networks (WLAN) comprising a plurality of AP groups, each AP group being managed by a respective controller, the computer implemented method comprising:
at each AP group controller, receiving neighbor node information and keys utilized at currently serving APs within the respective AP group that are proximate APs within different AP groups, and storing the received neighbor node information and keys in a common Neighbor Key Cache Server (NKCS) configured for managing keys used to authenticate client devices to APs; and
at each AP group controller, in response to receiving a client device authentication request from a managed AP proximate an AP within a different AP group, searching the common NKCS using a client key identifier of the client device to identify within the NKCS a corresponding client device key, and transmitting the identified client device key toward the requesting AP to enable thereby authentication of the client device to the requesting AP."

Should Read:
-- 1. A computer implemented method, in a controller managing at least one group of access points (APs) in a wireless local area networks (WLAN) comprising a plurality of AP groups, each AP group being managed by a respective controller, the computer implemented method comprising:
at each AP group controller, receiving neighbor node information and keys utilized at currently serving APs within the respective AP group that are proximate APs within different AP groups, and storing the received neighbor node information and keys in a common Neighbor Key Cache Server (NKCS) configured for managing keys used to authenticate client devices to APs; and
at each AP group controller, in response to receiving a client device authentication request from a managed AP proximate an AP within a different AP group, searching the common NKCS using a client key identifier of the client device to identify within the NKCS a corresponding client device Signed and Sealed this
Fourth Day of November, 2025

John A. Squires
*Director of the United States Patent and Trademark Office* key, and transmitting the identified client device key toward the requesting AP to enable thereby authentication of the client device to the requesting AP. --

(Column 21, Line 17 through Column 22, Line 15 – Claim 25):
Currently Reads:
"25. A Neighbor Key Cache Server (NKCS) for managing keys used to authenticate client devices to access points (APs) in a wireless local areal networks (WLAN) comprising a plurality of AP groups, each AP group being managed by a respective controller, the NKCS comprising processing resources and non-transitory memory resources, the processing resources configured to execute software instructions stored in the non-transitory memory resources to provide thereby a key caching method, comprising:
receiving, from group controllers, neighbor node information and keys utilized at currently serving APs within respective AP groups that are proximate APs within different AP groups;
storing the received neighbor node information and keys; and
in response to a controller request for a client device key, transmitting the client device key toward the requesting controller to enable an AP in the corresponding controlled AP group to authenticate the client device;
wherein the NKCS is configured exchange client device authentication data with AP group controllers associated with different WLAN service providers."

Should Read:
-- 25. A Neighbor Key Cache Server (NKCS) for managing keys used to authenticate client devices to access points (APs) in a wireless local area networks (WLAN) comprising a plurality of AP groups, each AP group being managed by a respective controller, the NKCS comprising processing resources and non-transitory memory resources, the processing resources configured to execute software instructions stored in the non-transitory memory resources to provide thereby a key caching method, comprising:
receiving, from group controllers, neighbor node information and keys utilized at currently serving APs within respective AP groups that are proximate APs within different AP groups;
storing the received neighbor node information and keys; and
in response to a controller request for a client device key, transmitting the client device key toward the requesting controller to enable an AP in the corresponding controlled AP group to authenticate the client device;
wherein the NKCS is configured to exchange client device authentication data with AP group controllers associated with different WLAN service providers. --